United States Patent [19]
Dobbeck

[11] Patent Number: 5,594,982
[45] Date of Patent: Jan. 21, 1997

[54] DUCTWORK ALIGNMENT TOOL

[76] Inventor: Mark E. Dobbeck, 3407 Dahlgreen Dr., Westerville, Ohio 43081

[21] Appl. No.: 389,794

[22] Filed: Feb. 16, 1995

[51] Int. Cl.$^6$ .................................................. B23P 11/00
[52] U.S. Cl. ............................ 29/243.5; 29/238; 29/270; 29/275
[58] Field of Search .................................. 29/238, 243.5, 29/243.56, 275, 270, 271, 281.5

[56] References Cited

U.S. PATENT DOCUMENTS

| | | | |
|---|---|---|---|
| 146,207 | 1/1874 | Schneider | 29/238 |
| 1,596,678 | 8/1926 | Miller | 29/270 |
| 1,602,815 | 10/1926 | Feather | 29/225 |
| 1,900,314 | 3/1933 | Strom | 29/270 |
| 1,946,063 | 2/1934 | Dodge | 29/275 |
| 2,613,562 | 10/1952 | Clark | 29/270 |
| 2,736,088 | 2/1956 | Thygeson | 254/131 |
| 3,619,887 | 11/1971 | McLaughlin | 29/275 |
| 3,626,572 | 12/1971 | Chang | 29/270 |
| 3,689,977 | 9/1972 | Crabbe | 29/280 |
| 4,649,613 | 3/1987 | Bednarik | 29/270 |
| 5,212,860 | 5/1993 | Lakey | 29/270 |

*Primary Examiner*—Bruce M. Kisliuk
*Assistant Examiner*—Thomas W. Lynch
*Attorney, Agent, or Firm*—Thomas S. Baker, Jr.

[57] ABSTRACT

A hand tool for aligning misaligned adjacent ductwork sections having return flange terminations is provided with a sheet metal base area having integrally formed side flanges and an integral V-shaped notch element which functions to align the ductwork sections for subsequent installation of a flanged cleat interconnection when the hand tool is advanced manually to its final position.

2 Claims, 1 Drawing Sheet

DUCTWORK ALIGNMENT TOOL

FIELD OF THE INVENTION

This invention relates generally to hand tools, and particularly concerns a hand tool useful for properly aligning adjacent ductwork sections having return flange terminations in preparation for the insertion of a co-operating flanged cleat that securely joins the adjacent ductwork sections together.

BACKGROUND OF THE INVENTION

Ductwork utilized in the construction of conventional residential and commercial heating and air conditioning systems typically utilizes numerous flanged cleats to securely join various adjacent flanged ductwork sections together. However, in the on-site construction process the adjacent ductwork sections often are not initially properly aligned relative to each other and such misalignment frequently involve displacements in more than one coordinate axis direction.

Heretofore, any of several different types of known articulated and jawed hand tools have been utilized by the ductwork installer to achieve proper ductwork section alignment prior to subsequent flanged cleat insertion. See for instance, the alignment hand tool disclosed in U.S. Pat. No. 5,020,202 issued in the name of Turrell. Also see the abstract disclosure of the International Patent Application No. 87-279016/40 of Liebehenz (DE 3706-244-A) for a ductwork joiner arrangement utilizing rivets rather than flanged cleats as fasteners but utilizing an articulated and jawed hand tool.

For an example of an alignment tool that preferably is driven by an electric, pneumatic, or other type of power source, see U.S. Pat. No. 3,887,986 issued in the name of Walton.

The articulated hand tools, irrespective of the exact form of the connecting device used, are generally difficult to manipulate when simultaneously initially and manually properly positioning adjacent ductwork sections—especially in instances where the ductwork sections are of moderate to large cross-sectional size.

I have discovered a relatively simple, non-articulated hand tool formed of sheet metal that may be conveniently utilized to obtain proper initial alignment of adjacent flanged ductwork sections preparatory to the insertion of a co-operating flanged cleat fastener into the ductwork flanges.

SUMMARY OF THE INVENTION

The one-piece hand tool of the present invention is preferably formed of sheet metal with a generally U-shaped cross-section configuration having a flat base area bounded on each of two opposite sides by an up-standing, relatively narrow, side flange. Located in the tool base area is a relatively deep, V-shaped notch having an open end that basically comprises one end of the tool. Although not necessary to utilization of the tool, each of the side flanges may be provided with an offset end portion that in some instances is useful in the process of removing the tool from ductwork sections that have been properly aligned with the aid of the tool.

To utilize the hand tool to align misaligned adjacent ductwork sections having return flange terminations for subsequent joinder by a co-operating return flange cleat, the tool open end with V-shaped notch is inserted under adjacent ductwork section return flanges and the tool then is manually driven forward or advanced under the return flanges until the point or apex of the tool V-shaped notch bottoms on both ductwork sections. The drive action brings both of the adjacent ductwork sections into proper alignment and a flanged cleat may then be conveniently inserted under the ductwork section return flanges to effect their proper joinder.

Other advantages of the present invention will become apparent during a careful consideration of the drawings, detailed description, and abstract which follow.

DETAILED DESCRIPTION

Figure 1:
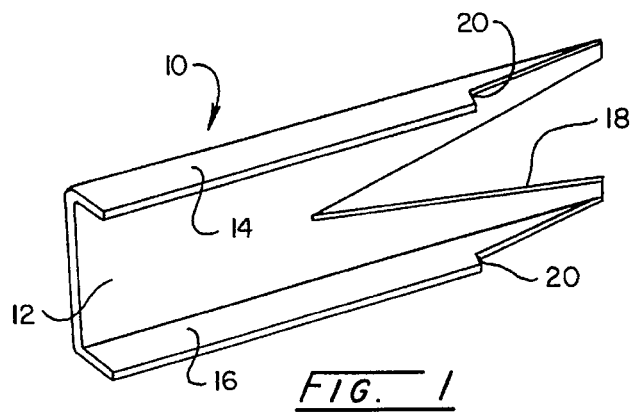
FIG. 1 is a isometric view of a preferred embodiment of the hand tool of the present invention.

FIG. 1 illustrates a preferred embodiment 10 of the hand tool of the present invention. Tool 10 is fabricated of sheet metal and basically is comprised of a base area 12, integrally-joined, upstanding, relatively narrow, edge flanges 14 and 16, and a V-shaped notch 18 formed in base area 12 with its open end essentially comprising one end of tool 10. In one actual embodiment of the invention tool 10 was formed of 16 gauge mild galvanized steel with notch 18 having a depth of 3¾ inch and an included angle of 20°. The tool overall was approximately 6 inches long and flanges 14 and 16 were ½ inch in width and formed at an angle of 90° relative to the plane of base area 12.

Each of edge flanges 14 and 16 may optionally and advantageously be provided with a offset end portion 20 positioned approximately 1 inch from the tool end. Such offset end portions are each essentially an end shoulder and may be utilized with an ancillary hand tool such as a hammer to forcefully withdraw tool 10 from co-operation with engaged ductwork section return flange terminations after the ductwork sections have been partially joined by a flanges cleat connector.

Figure 2:
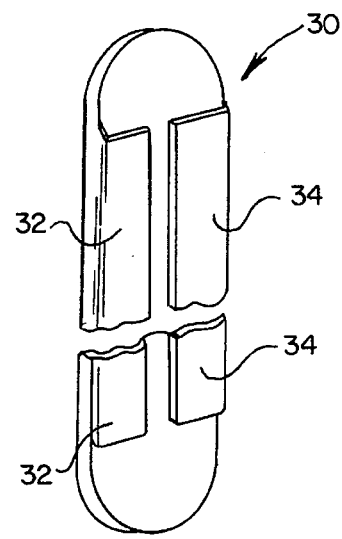
FIG. 2 is an isometric view of a conventional flanged cleat of the type utilized to join adjacent ductwork sections having return flange terminations.

FIG. 2 illustrates a conventional flanged cleat element 30 of the type frequently utilized to join adjacent ductwork sections having return flange terminations. Cleat 30 is provided with a pair of return flange elements 32 and 34, and generally is formed of the same sheet metal material that forms the to-be-connected flanged ductwork sections.

Figure 3:
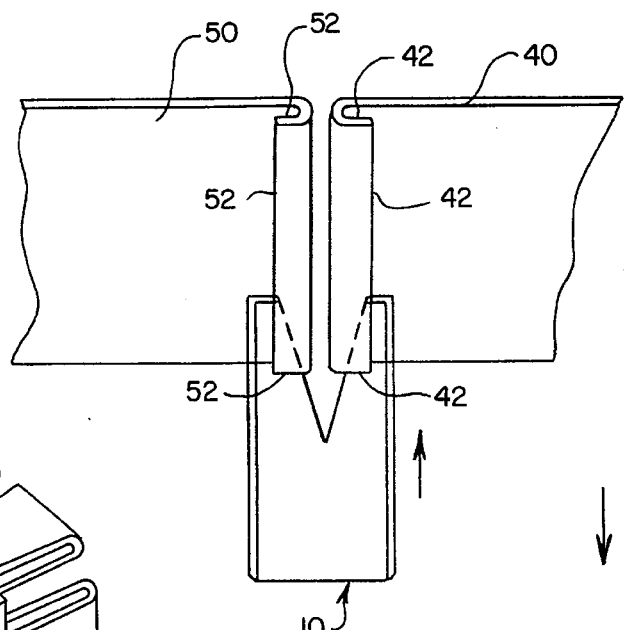
FIG. 3 is an elevation view illustrating the tool of FIG. 1 at an early stage in its utilization to align adjacent ductwork sections having return flange terminations.
Figure 5:
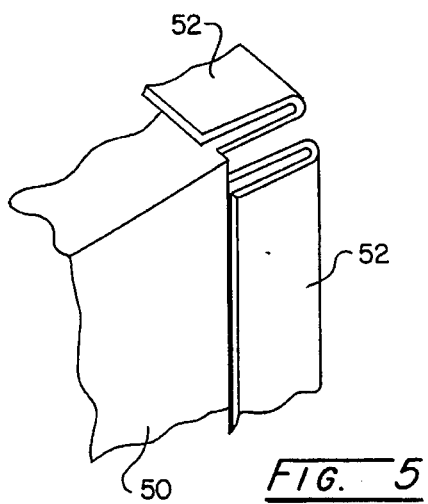
FIG. 5 is a partial isometric view of a typical corner of a ductwork section having return flange terminations.
Figure 4:
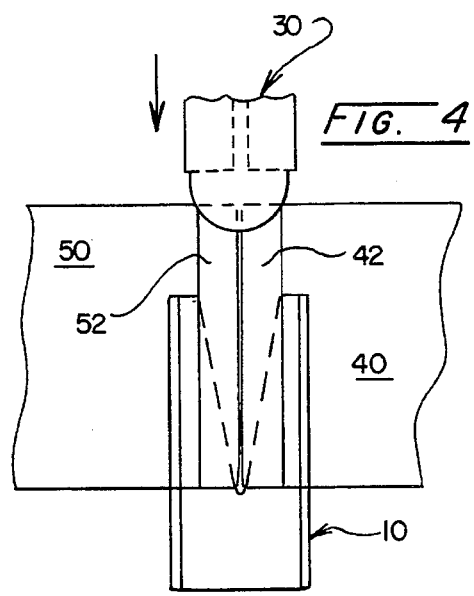
FIG. 4 is an elevation view similar to FIG. 3 but illustrating the tool of FIG. 1 at its late stage in its utilization of align adjacent flanged ductwork sections.

FIG. 3 illustrates a pair of adjacently positioned, and slightly misaligned, ductwork sections 40 and S0 prior to their joinder with a flanged cleat 30. Each such ductwork section generally has more than one return flange termination 42, 52 of the type more clearly detailed in FIG. 5. As shown in FIG. 3, hand tool 10 is initially manually inserted with the open end portion of its V-shaped notch 18 under adjacent return flanges 42, 52 of the misaligned ductwork sections. Further advancement of tool 10 in the direction of the FIG. 3 arrow to its relative position shown in FIG. 4 brings ductwork sections 40 and 50 into proper alignment at the point in time when the bends of adjacent co-operating flanges 42 and 52 contact the apex or point of the hand tool V-shaped notch 18. At that stage of hand tool advancement the flanged cleat 30 may conveniently be inserted into co-operating engagement with return flanges 42 and 52 by advancement in the direction shown by the FIG. 4 arrow. Alternatively, if the ductwork sections 40 and 50 of FIG. 4 are blocked in position following their proper alignment by hand tool 10, hand tool 10 may be withdrawn and flanged cleat 30 may be inserted in the place of tool 10 and installed completely to effect ductwork section joinder.

Other materials and component sizes and shapes may be utilized in the practice of this invention without departing from the scope or spirit of the claims which follow.

I claim as my invention:

1. A hand tool for use in aligning misaligned adjacent ductwork sections having return flange terminations, and comprising:

- a relatively thin flat sheet metal base area of substantially uniform thickness having two sides and two ends;
- a pair of spaced-apart upstanding flanges integrally formed with said sheet metal base area at opposite sides of said base area; and
- a V-shaped notch provided in said sheet metal base area intermediate said pair of upstanding flanges having an open end portion which opens into one end of said base area and an apex spaced intermediate said ends of said base area.

2. The hand tool defined by claim 1 wherein said pair of spaced-apart upstanding flanges are each provided with an integral offset shoulder element which faces said V-shaped notch open end portion of said base area.

\* \* \* \* \*